(No Model.)

A. PARKS, Jr.
LIQUID SEPARATOR.

No. 418,984. Patented Jan. 7, 1890.

Witnesses
John S. Finch
L. A. Davis

Inventor
Alexander Parks Jr.
By C. M. Alexander
Attorney

UNITED STATES PATENT OFFICE.

ALEXANDER PARKS, JR., OF MARTINSBURG, WEST VIRGINIA.

LIQUID-SEPARATOR.

SPECIFICATION forming part of Letters Patent No. 418,984, dated January 7, 1890.

Application filed October 1, 1889. Serial No. 325,637. (No model.)

*To all whom it may concern:*

Be it known that I, ALEXANDER PARKS, Jr., a citizen of the United States, residing at Martinsburg, in the county of Berkeley and State of West Virginia, have invented certain new and useful Improvements in Liquid-Separators, of which the following is a specification, reference being had therein to the accompanying drawings, in which—

Figure 1:
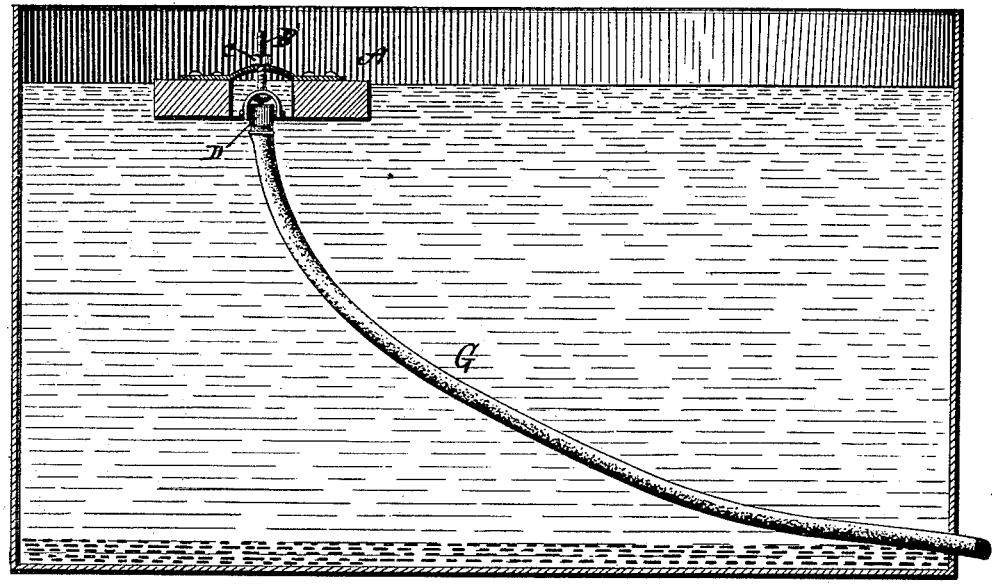
Figure 2:
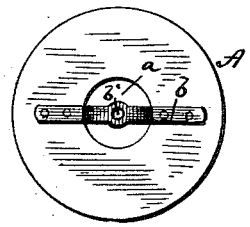
Figure 3:
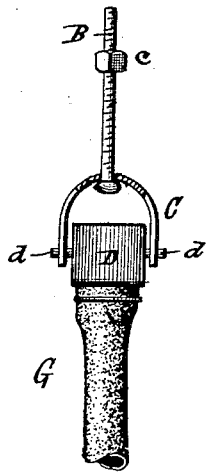

Figure 1 represents a vertical sectional view of a tank provided with my invention; Fig. 2, a plan view of my improved float; Fig. 3, a detail view of the device employed for pivotally connecting the flexible conducting-tube to the float, and Fig. 4 a plan view of another form of float.

The object of the invention is to provide an improved automatic device for separating or running off the thin watery matter from above the thicker precipitated matter without disturbing or agitating the latter in the least, but leaving it in the bottom of the tank essentially free from the watery matter and to be removed in any convenient manner, as will be more fully hereinafter set forth.

Figure 4:
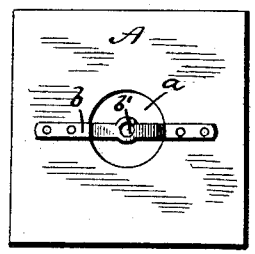

In the accompanying drawings, A designates a float, which may be constructed of any material and made either solid or hollow. A round float, as shown in Fig. 2, is preferred; but it may be made square, as shown in Fig. 4, or any other desired shape, as is evident. The float is provided with a vertical central aperture $a$, and across this aperture is secured an arched bar $b$, this bar being provided with a central bolt-hole $b'$. Passed through this hole $b'$ is a vertical screw-threaded bolt B, which is adjustably supported in the central aperture in the float by means of a nut $c$, which rests upon the bridge or bar $b$. Swivelly connected to the lower headed end of the bolt B is a yoke or clevis C, between the depending arms of which is pivotally secured, by pivots $d$, a coupling D. To this coupling is secured the upper end of a flexible conducting-pipe G, which is connected at its lower end to a suitable outlet-pipe at or near the bottom of the tank.

The device is shown in position for operation in Fig. 1. By means of the bolt and nut the upper inlet end of the conducting-hose may be adjusted according to the depth of sediment or precipitate in the bottom of the tank. The swivel and pivoted connection of the hose to the bolt permits the hose to automatically adjust itself as fast as the float falls.

By means of this device the thin watery matter above the sediment in the bottom of the tank may be entirely and automatically run off without disturbing the latter.

The invention might be employed with equal advantage to remove the scum and collected matter from off the surface of any liquid without unduly agitating the liquid.

Having thus fully described my invention, what I claim, and desire to secure by Letters Patent, is—

1. The combination, with a float provided with an opening, of an adjustable bolt supported within this opening, and a depending hose pivotally connected to the said adjustable bolt, whereby the said hose will automatically accommodate itself to the constantly-varying positions of the float, substantially as described.

2. The combination, with a float provided with a central opening, of an adjustable bolt supported in this opening, and a depending flexible hose swivelly and pivotally connected to the said bolt, substantially as described.

In testimony whereof I affix my signature in presence of two witnesses.

ALEXANDER PARKS, JR.

Witnesses:
 ADRIAN C. NADENBOUSCH,
 JNO. HENSHAW.